United States Patent
Slattery et al.

[11] Patent Number: 5,988,488
[45] Date of Patent: Nov. 23, 1999

[54] PROCESS OF BONDING COPPER AND TUNGSTEN

[75] Inventors: Kevin T. Slattery, St. Charles; Daniel E. Driemeyer, Manchester, both of Mo.

[73] Assignee: McDonnell Douglas Corporation, St. Louis, Mo.

[21] Appl. No.: 08/921,571

[22] Filed: Sep. 2, 1997

[51] Int. Cl.$^6$ .................................................. B05D 7/00
[52] U.S. Cl. ..................... 228/262.6; 228/194; 228/198; 228/124.1; 428/547; 428/550; 428/610
[58] Field of Search .................................. 228/194, 198, 228/124.1, 262.6; 428/547, 610

[56] References Cited

U.S. PATENT DOCUMENTS

| | | | |
|---|---|---|---|
| 4,886,709 | 12/1989 | Sasame et al. | 428/552 |
| 5,126,102 | 6/1992 | Takahashi et al. | 419/2 |
| 5,705,283 | 1/1998 | Upadhya | 428/610 |

Primary Examiner—Samuel M. Heinrich
Assistant Examiner—M. Alexandra Elve
Attorney, Agent, or Firm—Westerlund & Powell, P.C.; Robert A. Westerlund; Ramon R. Hoch

[57] ABSTRACT

Process for bonding a copper substrate to a tungsten substrate by providing a thin metallic adhesion promoting film bonded to a tungsten substrate and a functionally graded material (FGM) interlayer bonding the thin metallic adhesion promoting film to the copper substrate. The FGM interlayer is formed by thermal plasma spraying mixtures of copper powder and tungsten powder in a varied blending ratio such that the blending ratio of the copper powder and the tungsten powder that is fed to a plasma torch is intermittently adjusted to provide progressively higher copper content/tungsten content, by volume, ratio values in the interlayer in a lineal direction extending from the tungsten substrate towards the copper substrate. The resulting copper to tungsten joint well accommodates the difference in the coefficient of thermal expansion of the materials.

20 Claims, 1 Drawing Sheet

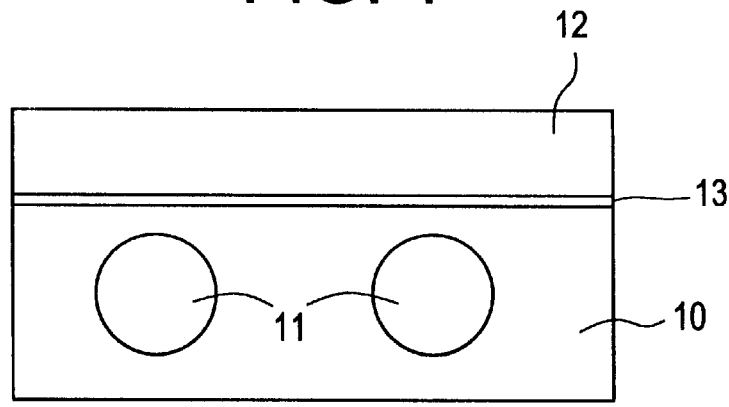
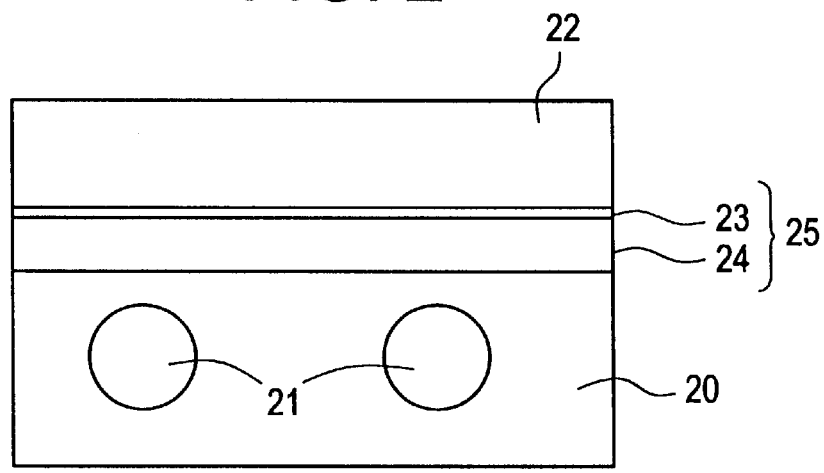
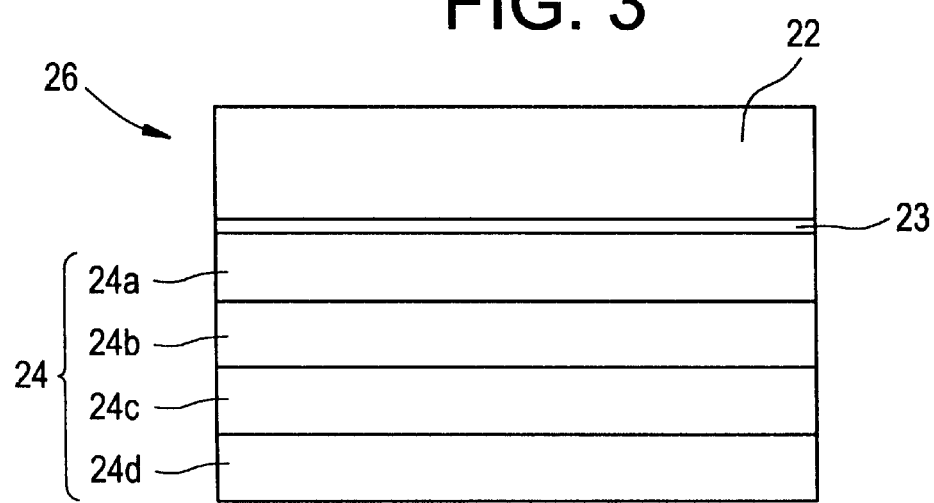

PROCESS OF BONDING COPPER AND TUNGSTEN

This invention was made under contract no. AC-3013 awarded by Sandia National Lab. The Government has certain rights to this invention.

BACKGROUND OF THE INVENTION

The invention relates to bonding materials having different coefficients of thermal expansions, and more particularly, to an improved process for bonding copper to tungsten.

One of the difficulties in the fabrication and use of bonded joints of dissimilar materials is accommodating the differences in their respective coefficients of thermal expansion (CTE). CTE is also often referred to as the coefficient of linear expansion, and these terms have interchangeable meaning. The difference in CTE's of bonded materials can result in stresses being exerted at the bondline during thermal cycling and after joinder at elevated temperatures. These stresses can reduce the service life, and even cause failure of the joints. The joint failures are especially prone to occur during cool-down from the initial joining temperature or in the course of heat cycles during service.

An inter-metal bonding system of interest in nuclear fusion research in particular is that of copper to tungsten. As illustrated in FIG. 1, in the nuclear fusion research milieu, the application of copper-tungsten bonds generally involves joining an exterior surface of a water-cooled copper alloy heat sink 10 to a tungsten tile 12, referred to occasionally herein as "armor," to protect the copper alloy material constituting the heat sink 10 from the sputtering erosion and occasionally extreme temperatures that can be generated by the reactor. The copper heat sink 10 has interior water channels 11 that permit water to flow through the heat sink 10 for heat exchange and cooling purposes. Previously, a metal joint 13 has been made between the copper alloy heat sink 10 and the tungsten tile 12 by brazing or direct diffusion bonding techniques. Namely, a single layer of mixed copper and tungsten material has been brazed or diffusion bonded in-between the copper alloy heat sink 10 and the tungsten tile 12. However, according to the HANDBOOK OF CHEMISTRY AND PHYSICS, 56th Ed., CRC Press, Inc., Cleveland, Ohio, 1975, p. D-173, the coefficient of thermal expansion (at 25° C.) for tungsten is $4.5 \times 10^6 (°C.)^{-1}$ while the value for copper is $16.6 \times 10^6$. This considerable difference in the respective CTE's of copper and tungsten, if not adequately addressed, can set the stage for potential joint failures due to thermal stresses exerted on the structures during bonding of these materials.

For instance, brazed copper-tungsten joints are relatively thin intervening connection structures between the copper and tungsten bodies. This short joint distance hinders the ability of the joint to effectively spread out strain differences arising from differences in the copper and tungsten CTE's, which, in turn, aggravates thermal stresses. Similarly, a diffusion bond formed between the copper heat sink 10 and tungsten tile 12 by hot pressing at high temperature and pressure also results in a relatively narrow joint region between the respective substrates. For instance, a vacuum brazed layer joint may only be on the order of approximately 125 $\mu$m thick, while a direct diffusion bonded joint formed by hot pressing may be only approximately 25 $\mu$m thick.

SUMMARY OF THE INVENTION

The invention relates to a process for bonding a copper substrate to a tungsten substrate which prevents joint defects and failures from arising, such as due to the difference in the thermal coefficients of expansion of the substrates.

The inventive process effectively bonds a copper substrate to a tungsten substrate in this manner by providing a unique intervening joint system including a thin metallic adhesion promoting film in contact with the tungsten substrate and a functionally graded material (FGM) interlayer situated between the copper film and copper substrate. The FGM interlayer is formed by thermal plasma spraying mixtures of copper and tungsten powders at different blending ratios. The blending ratio of the copper powder and tungsten powder that is fed to the plasma torch is intermittently adjusted to provide progressively higher copper content/tungsten content, by volume, ratio values in the deposited interlayer in a lineal direction extending from the tungsten substrate towards the copper substrate. The plasma spraying can be performed continuously by adjusting the Cu/W powder blend rate being introduced to the plasma torch during operation without interruption of spraying, or, alternatively, discrete plasma sprayed sublayers can be formed one on the other, with either approach being suitable for providing the desired Cu/W content gradient in the joint between the tungsten and copper substrates.

As a consequence, a concentration gradient is formed in the (FGM) interlayer of the joint system in which the concentration of copper relative to tungsten steadily increases in the direction approaching the copper substrate while it steadily decreases in the direction approaching the tungsten substrate, and, a converse relationship applies to the tungsten concentration in the FGM interlayer. This functional grading of the concentrations of copper and tungsten in the joint between the two substrates provides a transition region for spreading out and attenuating the effects of the differences in the CTE's of the two substrates and thereby avoids an abrupt localized changeover in thermal properties at the joint. The thin metallic adhesion promoting film layer is used as a "glue" layer to promote bonding of the FGM interlayer stack per se to the tungsten substrate. The thin metallic film layer preferably is applied by techniques permitting uniform deposition in relatively thin thicknesses of less than 1 $\mu$m, such as by physical or chemical vapor deposition techniques. The thin metallic film layer material is preferably pure copper, although it can also be other pure metals such as, for example, chromium, nickel, platinum, palladium, cobalt, silver, tungsten, gold, or even alloys of two or more of these metals.

In one more particular embodiment, the inventive process includes the steps of:

fixedly depositing a thin film layer of copper on a surface of a tungsten body;

depositing a functionally graded material interlayer comprising copper and tungsten on the thin copper film supported by the tungsten body to form an intermediate assembly, wherein the interlayer is formed by plasma spraying a plurality of different blends of tungsten and copper powders on the copper film such that the interlayer has progressively higher Cu/W, by volume, ratio values in a lineal direction extending from the tungsten substrate towards the copper substrate; and bonding a copper body to the deposited interlayer.

In a further embodiment, the plasma spray-deposited interlayer can be ground back prior to the step of joining the intermediate assembly to the copper substrate, if needed, to a desired thickness and/or to ensure that the plasma-deposited interlayer assumes the proper surface profile matching that of the opposing copper substrate. Also, the subsequent step of bonding the copper body to the consolidated intermediate assembly is a solid-to-solid operation thereby allowing more process flexibility, which can be accomplished by hot pressing, such as HIP, to form a diffusion bond, or, alternatively, by brazing or soldering.

The use of plasma spray deposition to form the interlayer advantageously provides in situ sintering, densification and substrate bonding action with the metal powders to eliminate the need for post treatment to accomplish these effects. Another advantage of the present invention is that only copper and tungsten materials are needed in forming the joint, which simplifies manufacturing. Also, a wide range of incrementally varying copper/tungsten formulations can be used in constructing the Cu/W functionally graded material interlayer to further reduce the thermal stresses experienced at the juncture of a copper body and a tungsten body. Another advantage is that the plasma sprayed interlayer can be easily deposited over complex surface topographies and it can conform to areas of mismatch between the copper and the tungsten. Furthermore, the functionally graded material interlayer can be plasma sprayed as surface coatings covering large areas of tungsten substrates, if needed. Yet another advantage of the present invention is that low temperature diffusion bonding (e.g., at 450–550° C.) can be used to attach the tungsten substrate bearing the Cu/W functionally graded material interlayer to the copper substrate. The joint system of the present invention also offers the advantages of lowering joining stresses and enabling the use of stronger and weldable precipitation-hardened copper alloys such as CuNiBe and CuCrZr. The process of this invention is generally applicable to joining copper (alloy) and tungsten structural substrates in a wide variety of settings, including in fusion reactor research and electronic applications.

For purposes of this invention, the terminology "copper", as used herein, can encompass elemental copper or copper alloys unless specified otherwise. The terminology "bonds" and variants thereof, means securely joining or uniting two or more separate bodies together to form an integral structure.

BRIEF DESCRIPTION OF THE DRAWINGS

These and various other features and aspects of the present invention will be readily understood with reference to the following detailed description read in conjunction with the accompanying drawings, in which:

FIG. 1 is cross-sectional view of a copper alloy heat sink joined to a tungsten armor tile according to the prior art.

FIG. 2 is cross-sectional view of a copper alloy heat sink joined to a tungsten armor tile via the combined copper/tungsten functionally graded material interlayer and thin film adhesion layer according to the process of the present invention.

FIG. 3 is an enlarged cross-sectional view of an intermediate assembly structure of the process of the present invention illustrating the functionally graded material interlayer and copper adhesion film used as the joint system.

The drawings are not necessarily to scale, as the thicknesses of the various layers are shown for visual clarity and should not be interpreted in a limiting sense unless otherwise indicated herein.

DETAILED DESCRIPTION OF THE INVENTION

Referring now to the drawings, and particularly to FIG. 2, there is shown a representative portion of a completed copper to tungsten joint provided by the process of this invention. Namely, a functionally graded material (FGM) interlayer 24 is used in conjunction with a thin pure copper film 23 to form a joint system 25 between a tungsten tile body 22 and a copper alloy heat sink body 20. The tungsten tile 22 bears the thin pure copper layer 23 on a side confronting the interlayer 24, in which the interlayer 24 has a progressively increasing fraction of copper content in a direction moving away from a tungsten tile 22 towards the copper alloy heat sink body 20. The copper-tungsten FGM interlayer 24 generally can be in the 0.5 to 5 mm thick range, preferably about 2 mm, which is much thicker than would be encountered in conventional brazed joints or direct diffusion bond joints. The functionally graded material (FGM) interlayer 24 reduces thermal stresses at the transition zone or joint 25 between the tungsten body 22 and copper body 20 having different CTE's by changing the relative amounts of the two materials over the intervening distance represented by FGM interlayer 24. This avoids a relatively abrupt transition at the joint. The copper heat sink 21 includes water channels 21 for permitting cooling water to flow in, through, and back out of the heat sink 20.

The first step of the inventive process is the depositing of the thin pure copper film 23 on the surface of the tungsten tile 22, which preferably is done so as to provide a copper thickness of less than 1 $\mu$m, more preferably 50 to 1,000 Å. The purpose of this thin pure copper layer 41 is to serve as an adhesion promotion film between the tungsten body 22 and the FGM interlayer stack 24. If the thin pure copper film 23 is made too thin, it will not provide adequate adhesion, while, on the other hand, if it is made too thick, it may become subject to cohesive failure.

Although exemplified as copper material, it will be understood that other metallic materials that can be deposited in thin films could be used such as, for example, chromium, nickel, platinum, palladium, cobalt, silver, tungsten, gold, or even alloys of two or more of these metals.

The thin adhesion promoting film 23 can be deposited as a very thin, uniform layer by physical vapor deposition techniques, such as thermal evaporation or sputtering, chemical vapor deposition, ion plating, electroplating, plasma spraying, and the like. Sputtering is preferred. For example, a film of copper can be sputtered upon an exposed surface of the tungsten tile by ion bombardment of a copper target material. The sputtering process can be done by d.c. sputtering, radio frequency sputtering, or magnetron sputtering deposition. As is known in the art, a sputtering process is performed in a high vacuum system equipped with a target assembly and platens for holding the substrate, a tungsten tile in the disclosed embodiment of this invention, and preferably employs a magnetron. An inert gas, such as argon, helium, neon, krypton, or xenon, is introduced into a conventional sputtering system in the 1–10 mTorr range to provide the proper operating pressure. Either a rf voltage or a negative dc voltage is applied to the target to ignite a plasma (or a plasma igniter can be provided if needed), and creates a negative potential in the 1–10 keV range on the target with respect to the plasma. This voltage causes heavy ion bombardment, which, through momentum transfer, results in ejection of copper atoms from the target which deposit upon the surface of the tungsten tile. Sputtering provides excellent thickness uniformity and adhesion. Deposition rates from sputtering are relatively high, although the deposition rate for any given system must be empirically determined as will be understood by those skilled in the art.

In the next process step, the FGM interlayer 24 is deposited by plasma spraying. The FGM interlayer 24 is formed as a plasma-sprayed coating or coatings having different copper/tungsten content through its thickness as derived by intermittently varying the blending ratio of hard phase copper and tungsten powders being fed to a plasma torch.

Air is used to blow the copper and tungsten powders from separate supply lines into the hot zone of a conventional multi-ported plasma gun with valving providing to meter and adjust the relative proportions of each powder feed introduced into the hot zone of the gun where the powders commingle. The powders are melted into an alloy in a hot zone of the gun and then sprayed in droplet form as directed at the copper film 23 located on the tungsten substrate 22, where the droplets solidify upon cooling. The plasma spray apparatus can be a plasmatron for creating an elongated plasma torch. In any event, conventional plasma spray technology generally can be used to practice the invention as long as it permits blending of different types of powder feeds at controllably varied blending ratios.

The plasma spraying can be performed continuously by adjusting the Cu/W powder blend rate being introduced to the plasma torch during operation without interruption of spraying, or, alternatively, discrete plasma sprayed sublayers can be formed one on the other. Continuous spray coating is preferred for manufacturing ease, although either approach is suitable for providing the desired Cu/W content gradient in the joint between the tungsten and copper substrates.

An illustration of a plasma sprayed interlayer 24 composed of a plurality of separate coating sublayers or substrata 24a–24d having different Cu/W content ratios is provided in FIG. 3. The terminology "sublayers" is used for convenience sake, as it will be appreciated that the spray coatings are applied in a molten state, which upon solidification will define a thickness region or given stratum of interlayer 24 having a particular Cu/W content ratio once the FGM interlayer 24 is completed.

A plurality of FGM sublayers 24a–24d are formed by intermittently adjusting the copper and tungsten powder feeds to the plasma torch with incremental, progressive changes in the relative amounts of Cu and W for each FGM sublayer 24a–24d. For example, as shown in FIG. 3, four FGM layers 24a–24d can be prepared having 20% by volume incremental changes in the fraction of tungsten, with a first FGM layer 24a having a 20 vol. %/80 vol. % Cu/W mixing ratio deposited directly on the thin copper layer 23 on tungsten tile 22. Then a second FGM layer 24b having a 40 vol. %/60 vol. % Cu/W mixing ratio is deposited on the first FGM layer 24a, followed by a third FGM layer 24c having a 60 vol. %/40 vol. % Cu/W mixing ratio deposited on the second FGM layer 24b, and finally a fourth FGM layer 24d having a 80 vol. %/20 vol. % Cu/W mixing ratio deposited on the third FGM layer 24c on its top surface.

There is no particular limitation on the number of FGM coating sublayers provided in this manner as long as the criteria is satisfied that the FGM sublayers progressively contain higher contents of copper relative to the tungsten content in a direction moving away from the tungsten body towards the copper body. Although the provision of a constant incremental change in the mixing proportions of tungsten and copper from FGM coating sublayer to adjoining FGM coating sublayer is thought optimal, it is not necessarily required as long as the above-mentioned general criteria is satisfied. The overall thickness of the plasma sprayed FGM interlayer 24 generally can range from 0.5 to 5.0 mm, more preferably 1.5 to 2.5 mm. The plasma sprayed interlayer has very low porosity, e.g., below 5%, typically below 1%.

Also, the plasma spray-deposited interlayer 24 can be ground back prior to the step of joining the intermediate assembly to the copper substrate, if needed, to a desired thickness and/or to ensure that the plasma-deposited interlayer assumes the proper surface profile matching that of the opposing copper substrate.

The pure copper and tungsten powders used for mixing and forming the FGM interlayer 24 via plasma spray coating generally can have mean particle sizes (i.e., diameters) between about 0.5 to 100 $\mu$m. The tungsten and copper particles used need not be the same size. Also, while it is preferred to employ a binary mixture of copper and tungsten powders only to prepare the coating layers 24a–24d, it is within the contemplation of this invention to include one or more additional powder types in the overall powder blend, such as Ni, Be, Cr and/or Zr. For instance, where the heat sink 20 is a CuNiBe or CuCrZr copper alloy material, Ni, Be, Cr, and/or Zr powders can be added to the Cu-W powder blends for the FGM coating sublayers 24a–24d to further refine the compositional gradient and transition in the CTE between the copper heat sink 20 and the tungsten tile 22.

In any event, once the FGM interlayer 24 is formed upon the copper layer 23 on the tungsten body 22 to provide an intermediate assembly, no further consolidation treatment is necessary to sinter, densify and unite the FGM coating layers 24a–24d to the copper faced side of the tungsten body 22.

Then the intermediate subassembly has its exterior FGM coating sublayer 24d bonded to the surface of the copper body 20. This can be accomplished by hot pressing, e.g., hot isostatic pressing (HIP) at 450° C. or greater and at 105 MPA or greater pressure for 180–240 minutes, to unite the tungsten body 22 to the copper body 20 via the joint system comprised of the intervening FGM Cu-W material interlayer 24 and thin copper layer 23. The lay up of tungsten body 22 and FGM sublayers 24a–24d should be placed in a can or comparable restraining means effective to restrain the lateral surfaces of the FGM layers during the hot pressing process. The HIP process is implemented using an autoclave-like system in which the can holding the intermediate assembly is placed within an airtight pressure vessel which is filled with argon or other inert gas and the interior of the reaction vessel is heated to a very high temperature and brought to a very high pressure to compress the tile 22, copper film 23 and FGM interlayer 24 together. The hot pressing action forms a diffusion bond between the copper body 20 and the FGM interlayer 24. Alternatively, brazing, such as Cu—Mn, Cu—Ti, or Ag-based vacuum or flux braze, or soldering, can be used to join the copper body 20 to the FGM Cu-W material interlayer 24 borne by the tungsten body 22.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

For example, although this invention has been exemplified in the context of uniting a tungsten armor tile to a water-cooled copper alloy heat sink, such as used for fusion reactor research, it will be appreciated that this invention has other potential applications. For example, in the electronics industry, copper(copper alloy)/tungsten bonds that are more tolerant of thermal stresses could be used to advantage for making heat sinks whose coefficient of thermal expansion could exactly meet that of semiconductors.

What is claimed is:

1. A process for bonding a copper substrate to a tungsten substrate, comprising providing a thin metallic adhesion promoting film bonded to a tungsten substrate and a functionally graded material (FGM) interlayer bonding said thin metallic adhesion promoting film to a copper substrate, wherein said FGM interlayer is formed by thermal plasma spraying droplets of both copper and tungsten on said thin metallic adhesion promoting film where said droplets are derived from heating commingled mixtures of copper powder and tungsten powder fed to a plasma torch in a blending ratio varied such that said blending ratio of said copper powder and said tungsten powder is intermittently adjusted to provide progressively larger copper content/tungsten content, by volume, ratio values in said interlayer in a lineal direction extending from a side of the interlayer facing the tungsten substrate towards an opposite side of the interlayer upon which the copper substrate is bonded.

2. A process for bonding a copper body to a tungsten body, comprising the steps of:
 (a) fixedly depositing a thin adhesion promoting film layer having a thickness less than 1 μm and comprising copper on a surface of a tungsten body;
 (b) depositing a functionally graded material interlayer comprising copper and tungsten on said thin adhesion promoting film layer supported by said tungsten body to form an intermediate assembly, wherein said interlayer is formed by substeps comprising:
   (i) feeding a plurality of different commingled blends of tungsten and copper powders to a plasma torch,
   (ii) heating each of said plurality of blends of tungsten and copper powder in the plasma torch to form droplets of both copper and tungsten, and
   (iii) plasma spraying the droplets of both copper and tungsten on said thin adhesion promoting film layer, and wherein said plurality of different commingled blends of tungsten and copper powders are fed sequentially to the plasma torch in substep (i) in a manner such that said interlayer has progressively larger Cu/W, by volume, ratio values in a lineal direction extending from a side of the interlayer facing said tungsten body towards a copper body arranged on an opposite side of said interlayer; and
 (c) bonding said copper body to said deposited interlayer.

3. The process of claim 2, wherein said tungsten body is a tile.

4. The process of claim 2, wherein said copper body is a heat sink.

5. The process of claim 2, wherein said copper body comprises a copper alloy.

6. The process of claim 2, wherein said plasma spraying is performed continuously by adjusting the Cu/W powder blend ratio being introduced to a plasma torch during spraying.

7. The process of claim 2, wherein said plasma spraying is performed by depositing discrete plasma sprayed sublayers with interruptions in spraying in which the Cu/W powder blend ratio to be introduced to a plasma torch is changed.

8. The process of claim 2, further comprising the additional step of grinding said interlayer to a given thickness prior to said step of bonding said copper body to said deposited interlayer.

9. The process of claim 2, wherein said thin adhesion promoting film layer is formed by physical vapor deposition.

10. The process of claim 9, wherein said thin adhesion promoting film layer is formed by sputtering.

11. The process of claim 9, wherein said thin adhesion promoting film layer is formed by thermal evaporation.

12. The process of claim 2, wherein said thin adhesion promoting film layer is formed by chemical vapor deposition.

13. The process of claim 2, wherein said thin adhesion promoting film layer has a thickness between about 50 Å and 1 μm.

14. The process of claim 2, wherein said thin adhesion promoting film layer has a thickness between about 50 to 1,000 Å.

15. The process of claim 2, wherein said functionally graded material interlayer is formed with a thickness of from 0.5 to 5.0 mm.

16. The process of claim 2, wherein said functionally graded material interlayer is formed with a thickness of from 1.5 to 2.5 mm.

17. A process for bonding a copper substrate to a tungsten substrate, comprising the steps of:
 (a) fixedly depositing a thin adhesion promoting film layer on a surface of a tungsten substrate, wherein said thin adhesion promoting film layer comprises a metal selected from the group consisting of copper, chromium, nickel, platinum, palladium, cobalt, silver, tungsten, gold, and combinations thereof;
 (b) providing a functionally graded material interlayer comprising copper and tungsten on said thin adhesion promoting film layer supported by said tungsten substrate, wherein said interlayer is formed by substeps comprising:
   (i) feeding a plurality of different commingled blends of tungsten and copper powders to a plasma torch,
   (ii) heating each of said plurality of blends of tungsten and copper powder in the plasma torch to form droplets of both copper and tungsten,
   (iii) plasma spraying the droplets of both copper and tungsten to form said interlayer,
 wherein said plurality of different commingled blends of tungsten and copper powders are sequentially fed to the plasma torch in substep (i) in a manner such that said interlayer has progressively larger Cu/W, by volume, ratio values in a lineal direction extending away from a side of the interlayer facing said tungsten substrate towards a copper substrate located on an opposite side of the interlayer; and
 (c) bonding said copper substrate to said tungsten substrate via said deposited interlayer and said thin adhesion promoting film layer.

18. The process of claim 17, wherein said functionally graded material interlayer is formed with a thickness of from 0.5 to 5.0 mm.

19. The process of claim 17 wherein said functionally graded material interlayer is formed with a thickness of from 1.5 to 2.5 mm.

20. The process of claim 17, wherein said thin adhesion promoting film layer has a thickness between about 50 to 1,000 Å.

* * * * *